United States Patent [19]

Chiu et al.

[11] Patent Number: 5,033,965
[45] Date of Patent: Jul. 23, 1991

[54] THREE DIMENSIONAL GLOBE

[76] Inventors: Sam Chiu, 167 Sands St., #411, Brooklyn, N.Y. 11201; Jonathan Chang, 6649 Amethyst, Alta Loma, Calif. 91701

[21] Appl. No.: 424,188

[22] Filed: Oct. 19, 1989

[51] Int. Cl.$^5$ ............................................. G09B 27/00
[52] U.S. Cl. .................................... 434/131; 434/136
[58] Field of Search ............... 434/131, 133, 136, 142, 434/143, 145, 288, 289, 362/809; 368/80, 15, 16; D10/10

[56] References Cited

U.S. PATENT DOCUMENTS

| D. 174,464 | 4/1955 | Paul et al. ............................ D10/10 |
| D. 180,947 | 9/1957 | Fry ...................................... 434/133 X |
| D. 187,608 | 4/1960 | Merrigan ........................... D10/104 |
| 374,789 | 12/1987 | French ............................. 434/143 X |
| 480,367 | 8/1892 | Hallett .................................. 434/142 |
| 501,136 | 7/1893 | Gregory ............................... 434/288 |
| 1,289,849 | 12/1918 | Manson ................................ 434/131 |
| 1,959,601 | 5/1934 | Schulse ............................ 434/143 X |
| 2,000,457 | 5/1935 | Schulse ............................ 434/142 X |
| 2,014,290 | 3/1935 | Pohlman ............................ 434/131 |
| 2,279,162 | 4/1942 | Dupler ............................ 362/809 X |
| 3,049,813 | 8/1962 | List ..................................... 434/136 |
| 3,197,893 | 8/1965 | Mariotti .............................. 434/143 |
| 3,835,554 | 9/1974 | Mast ................................... 434/288 |
| 4,102,121 | 7/1978 | Veazey ............................ 434/142 X |
| 4,334,297 | 6/1982 | Oros ................................. 368/15 X |
| 4,400,162 | 8/1983 | Rustemis ............................ 434/291 |
| 4,421,420 | 12/1983 | Ushikoshi ......................... 368/80 X |
| 4,493,648 | 1/1985 | Suzuki ................................ 434/136 |
| 4,583,864 | 4/1986 | Graves ............................. 368/16 X |
| 4,702,703 | 10/1987 | Herbst ................................ 434/289 |

FOREIGN PATENT DOCUMENTS

| 1231465 | 12/1966 | Fed. Rep. of Germany ...... 434/131 |
| 1253936 | 1/1960 | France ................................. 362/809 |

OTHER PUBLICATIONS

"Transparent Celestial Globe"; Nystrom '65; p. 42; 1965.

Primary Examiner—Richard J. Apley
Assistant Examiner—Rachel M. Healey
Attorney, Agent, or Firm—Fleit, Jacobson, Cohn Price, Holman & Stern

[57] ABSTRACT

A three dimensional globe utilizing a transparent spherical globe having geographical areas outlined thereon with fluorescent paint combined with an external black light to illuminate and render uniquely observable all of the outline of the geographical areas. A clock with spherical members mounted at the ends of the hands thereon are associated with the globe to simulate the movement of planets in relation to the globe with the balls being relatively small and also fluorescent colored for effective illumination by the black light. The globe provides a unique, attractive and informative globe utilizing high technology and effective structure for movement of the globe in a rotational manner about a substantially vertical axis.

2 Claims, 2 Drawing Sheets

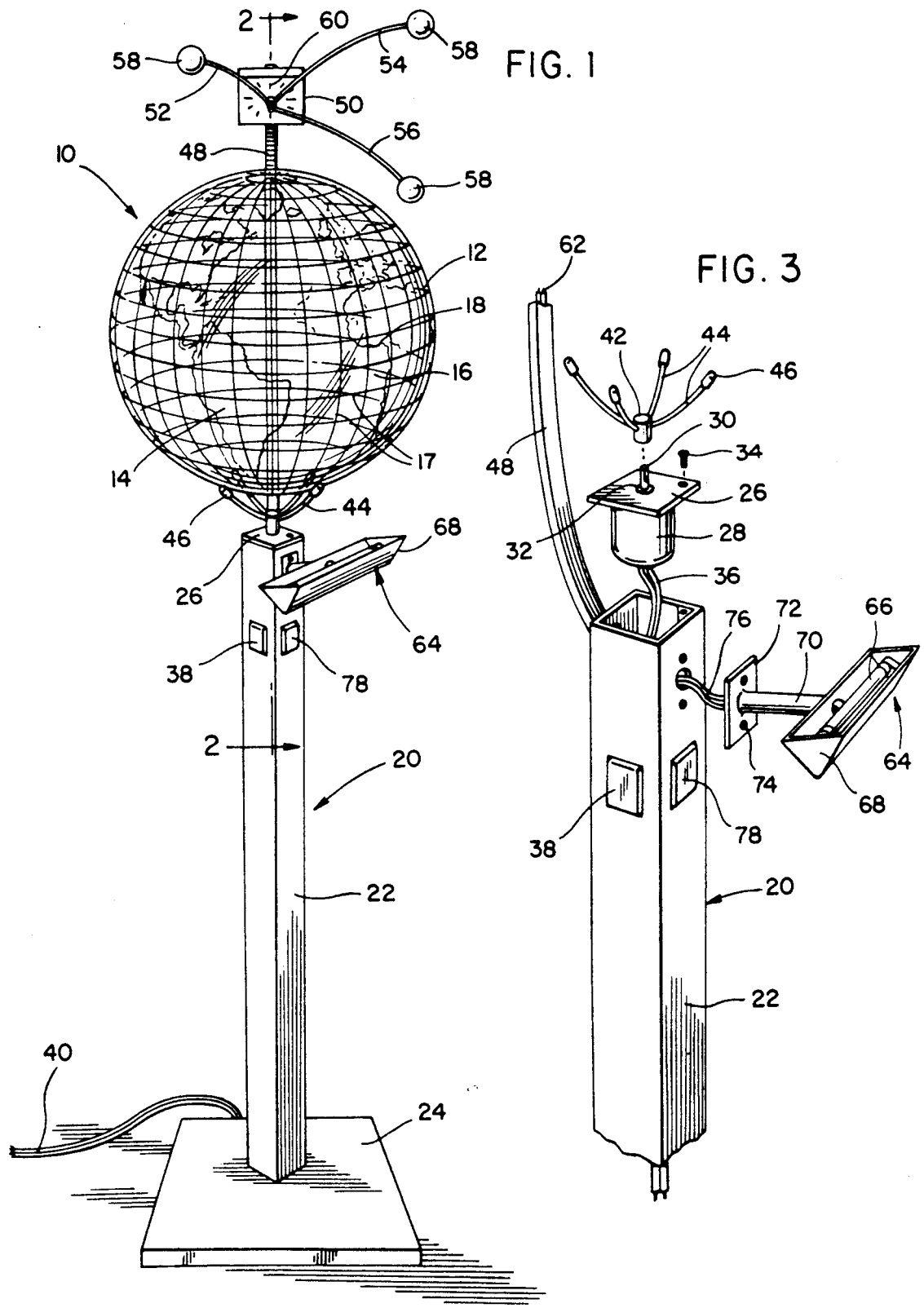

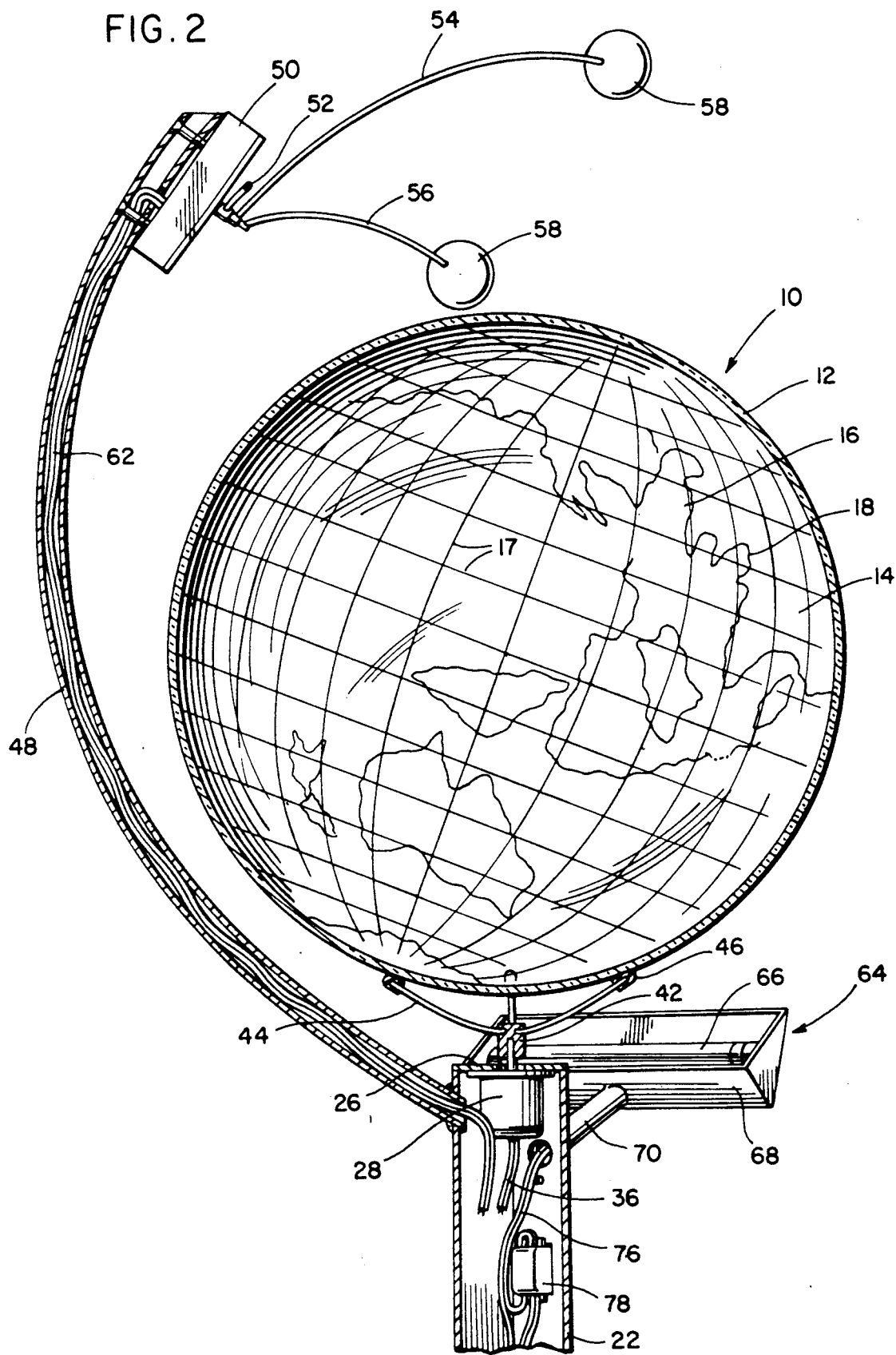

THREE DIMENSIONAL GLOBE

BACKGROUND OF THE INVENTION

Field of the Invention

The present invention generally relates to a three dimensional globe utilizing a transparent spherical globe having geographical areas outlined thereon with fluorescent paint combined with an external black light to illuminate and render uniquely observable all of the outline of the geographical areas. A clock with spherical members mounted at the ends of the hands thereon are associated with the globe to simulate the movement of planets in relation to the globe with the balls being relatively small and also fluorescent colored for effective illumination by the black light. The globe provides a unique, attractive and informative globe utilizing high technology and effective structure for movement of the globe in a rotational manner about a substantially vertical axis.

INFORMATION DISCLOSURE STATEMENT

The prior art in this field includes globe structures which are provided with external indicia to indicate various geographical areas and it is conventional for globes to be rotatable about an axis that is generally vertical but usually inclined to simulate the rotational axis of the earth. The following patents disclose previous globes. These globes, however, do not disclose structural arrangements equivalent to the present invention.

| | |
|---|---|
| 220,036 | 2,492,691 |
| 1,957,763 | 3,049,813 |
| 1,959,601 | 4,102,121 |
| 2,115,372 | 4,400,162 |
| 2,345,800 | |

SUMMARY OF THE INVENTION

An object of the present invention is to provide a three dimensional globe having a transparent, spherical hollow globe supported for rotational movement about a generally vertical axis and a motor for propelling the globe positioned in a vertically extending support or standard for rotating the globe at a relatively slow rate of speed.

Another object of the invention is to provide a three dimensional globe in accordance with the preceding object together with a clock mounted above and to one side of the globe with each hand of the clock extending beyond the confines of the clock and terminating in a small spherical ball to simulate movement of planets as the clock designates the time of day.

A further object of the invention is to provide a three dimensional globe in which the lobe and spherical balls representing planets are illuminated by a black light with the globe and balls including fluorescent coloring on the exterior thereof with the transparent globe including fluorescent paint outlining various geographical areas such as the land and sea masses of the earth.

Still another object of the invention is to provide a three dimensional globe which is highly unique in appearance, educational and attractive to observers.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the three dimensional globe of the present invention.

FIG. 2 is a vertical, sectional view, on an enlarged scale, taken substantially upon a plane passing along section line 2—2 on FIG. 1 illustrating specific structural details of the drive mechanism for the globe, the clock and balls on the ends of the clock hands and the blacklight structure for illuminating the globe.

FIG. 3 is a fragmental, exploded perspective view of the drive components and black light of the three dimensional globe.

DESCRIPTION OF THE PREFERRED EMBODIMENT

The three dimensional globe of the present invention is designated by numeral 10 and includes a hollow, spherical ball or globe 12 constructed of transparent plastic material having delineated thereon various land and sea masses 14 and 16 by fluorescent color lines 18 forming the outline of the land and sea masses. In addition, lines 17 indicating the longitude and latitude measurements of the earth's surface are also formed on the exterior surface of the globe 12.

The globe 12 is supported by a vertically elongated hollow stand generally designated by the numeral 20 and which includes a vertical standard 22 of square cross-sectional configuration provided with a platform or base 24 at its lower end with the standard 22 being rigidly affixed to the base 24 in any suitable manner. The upper end of the standard 22 is provided with a closure plate 26 having a small electric motor 28 suspended therefrom with the shaft 30 of the motor 28 extending through an aperture 32 in the plate 26. A screw threaded fastener 34 is provided in one opposite corner of the plate 26 to secure the plate and motor removably on the upper end of the standard 22. The motor 28 is provided with electrical conductors 36 connected thereto which are connected with a switch 38 adjacent the upper end of the standard 22. An electrical supply cord 40 is connected to an outlet plug in a conventional manner. The shaft 30 is provided with a supporting member 42 mounted thereon in telescopic and driving relation with the interior socket of the supporting member 42 and the exterior surface of the shaft 30 being polygonal to provide driving torque to the supporting member 42. The supporting member 42 includes four outwardly and upwardly curved arms 44 having resilient tips 46 thereon to cradle and support the globe 12 so that it can be easily removed when desired by merely lifting the globe 12 off the supporting arms 44 which form a cradle for the lower end of the globe. Alternatively, the globe 12 may be fixedly secured to the driving member 42 and in some instances fixedly secured to the drive shaft 30 with the globe being rotatable about a generally vertical axis with the land masses being illustrated in proper orientation so that in effect the rotational axis of the globe is similar to the rotational axis of the earth.

Mounted at the upper end of the standard 22 is an upwardly extending and arcuately curved support arm 48 that is rigidly affixed to the tubular standard 22 as illustrated in FIG. 2. The upper end of the arm 48 curves into generally overlying relation to an upper portion of the globe with the upper end of the arm also being spaced from the globe and supporting a clock 50. The clock 50 includes three hands 52, 54 and 56 which represent and are the hour, minute and second hands of the clock with each of the hands including a small spherical ball 58 on the outer end thereof. The hands 52, 54 and 56 are constructed of resilient material such as wire and the clock 50 has a quartz movement in which the second hand moves in a definite one-half second increment of movement from a stopped position to another stopped position thus causing vibrational movement and waving movement of the balls 58 during the movement of the clock hands 52, 54 and 56. Conventional indicia 60 is provided on the clock face in association with the clock hands in order to indicate the time of day. The clock 50 also includes electrical conductors 62 positioned within the tubular support arm 48 and extending downwardly into the standard 22 for connection with a source of electrical energy through the electrical supply cord 40.

The standard 22 also includes a black light generally designated by the reference numeral 64 which includes a black fluorescent light bulb 66 supported in an upwardly opening reflective housing 68 supported by a support arm 70 connected to a support plate 72 secured to the standard 22 by fasteners extending through apertures 74 in the support plate 72 and the upper end of the standard 22. Electrical conductors 76 are connected to the black light and to the cord 40 through a switch 78 by which the black light 66 can be energized and de-energized when desired.

The transparent globe 12 is constructed of clear acrylic plastic and the use of the transparent material provides a unique appearance characteristic to the rotating globe which is rotatable by the drive motor 28 at 1 rpm. The black fluorescent light provides illumination for the exterior of the globe as well as the balls driven by the clock. The fluorescent paint outlining the geographical areas such as the land and sea masses on earth will be effectively illuminated by the black light thereby providing a three dimensional effect due to the see-through characteristics of the globe. The motor 28 is directly connected with the globe either fixedly or removably without any gear reduction arrangements thereby simplifying the construction. The clock 50 serves not only as a timepiece but also enhances the attractiveness of the design and simulates movement of the planets with the sequential abrupt incremental movement of the clock hands serving to cause uneven resilient movement or waving of the balls as they move with the clock hands which are in the form of rod-like or wire-like resilient members.

With this construction, while a three dimensional effect is obtained, the present invention actually uses two dimensional paint designs on the hollow globe. The geographical areas outline all of the continents, islands, longitudes and latitudes and are in the form of fluorescent colors with the selection of colors being varied as desired. The slow rotational movement of the globe combined with the black fluorescent light beside the globe will illuminate the globe and also the quartz clock and the balls on the tip of the three hands. At night when all other lights are off in a room, the black fluorescent light can be turned on along with the one revolution per minute motor and the three dimensional globe will glow as it rotates and it has the appearance of floating in space surrounded by three small satellite planets rotating above the globe. As indicated, the quartz clock second hand moves in one-half second increments and the ball on its tip will shake or wave slightly during its rotational movement thereby increasing the visual appearance characteristics and observation characteristics of the three dimensional globe and clock.

The principles of this invention may also be incorporated into a solid globe having 3-D characteristics in which different color fluorescent paints are used to cover geographical areas such as continents, islands, oceans and the like on a clear acrylic sphere. The black light can then be placed inside the sphere to illuminate the globe and fluorescent paint. The slow speed motor can be above, below or inside the globe to rotate it at a slow speed to enable observation. The globe can simulate various planets including Earth, Moon, Mars, Saturn, etc.

Another embodiment of the invention enables it to be used as a bug light for use outdoors such as in a garden, on a porch or patio, etc. In this embodiment, the globe is constructed of electrically conductive wire which is energized by connection with a source of electricity to kill bugs coming into contact with the globe. The wire ball or sphere is colored with fluorescent paints and has a black light inside for illumination and attracting bugs. A slow speed motor is connected to the wire globe for rotation thereof with the motor being positioned under the globe in a manner similar to that in FIG. 2.

The invention is also useful in constructing see-through 3-D objects in which clear, see-through materials are used to construct scale models of various well-known objects with vertical and horizontal grid lines being painted thereon by the use of different color fluorescent paints to depict the shape or configuration of the object. The object may simulate a human body, animal body, structures such as buildings or bridges, vehicles such as land, sea or air vehicles, weapons, machines and substantially any animate or inanimate object. Internal organs, mechanisms or parts placed in the interior of the body may be painted with different color fluorescent paints to emphasize the internal details when illuminated by a black light.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A globe comprising a hollow spherical member constructed of rigid see-through material, indicia on the globe designating the outline of land and sea masses, said indicia also designating the longitude and latitude of the earth's surface, means supporting said spherical member, means rotating said spherical member, said indicia on the spherical member being fluorescent paint, and a black light illuminating the exterior of the spherical member to cause the outlines of the land, sea masses, longitude and latitude to fluoresce for observation, said means rotating the spherical member including an electric motor directly drivingly connected to the spherical member for rotating the spherical member at a slow speed, said means supporting the spherical member including a vertically elongated standard with a platform base, a support arm mounted at the upper end of the standard and curving upwardly and arcuately in spaced relation to the surface of the spherical member, a clock mounted at thee upper end of the support arm and including three time indicating hands, each of said hands including a spherical ball at the outer end thereof to simulate planets moving in relation to the spherical member, said balls on the ends of the hands being colored with fluorescent colors and illuminated by the black light, said black light being mounted at the upper end of said standard, switch means for operating the motor and black light with the switch means being independent of each other.

2. The structure as defined in claim 1 wherein said clock is a quartz clock and the hands are resilient rod-like members with the hands moving in abrupt intervals to cause the balls on the ends thereof to move in an erratic path during movement of the second hands.

* * * * *